(12) United States Patent
Ito et al.

(10) Patent No.: US 7,352,100 B2
(45) Date of Patent: Apr. 1, 2008

(54) DIRECT-CURRENT MOTOR

(75) Inventors: Yasuhide Ito, Hamamatsu (JP); Shinji Santo, Kosai (JP); Masayuki Kuwano, Kosai (JP); Toshio Yamamoto, Kosai (JP); Yoshiki Nakano, Hamamatsu (JP)

(73) Assignee: Asmo Co., Ltd., Umeda, Kosai-shi, Shizuoka-ken (JP)

( * ) Notice: Subject to any disclaimer, the term of this patent is extended or adjusted under 35 U.S.C. 154(b) by 249 days.

(21) Appl. No.: 11/368,823

(22) Filed: Mar. 6, 2006

(65) Prior Publication Data
US 2007/0069602 A1 Mar. 29, 2007

(30) Foreign Application Priority Data

Mar. 8, 2005 (JP) .............................. 2005-063979
May 24, 2005 (JP) .............................. 2005-151234

(51) Int. Cl.
*H02K 1/00* (2006.01)
(52) U.S. Cl. ..................... 310/216; 310/233; 310/261
(58) Field of Classification Search ........ 310/216–218, 310/261, 264, 265, 233
See application file for complete search history.

(56) References Cited

U.S. PATENT DOCUMENTS

| 4,394,597 | A | * | 7/1983 | Mas ........................... 310/268 |
| 6,819,025 | B2 | | 11/2004 | Egawa et al. |
| 7,116,029 | B2 | * | 10/2006 | Kerlin ........................ 310/166 |
| 7,157,828 | B2 | * | 1/2007 | Moroto et al. .............. 310/261 |
| 2002/0167232 | A1 | * | 11/2002 | Randall ........................ 310/54 |
| 2003/0111921 | A1 | * | 6/2003 | Honkura et al. ........ 310/154.12 |
| 2005/0067918 | A1 | * | 3/2005 | Holter et al. ................ 310/261 |
| 2005/0168089 | A1 | * | 8/2005 | Miyashita et al. ...... 310/156.57 |
| 2006/0012259 | A1 | * | 1/2006 | Kerlin ........................ 310/166 |
| 2006/0220489 | A1 | * | 10/2006 | Osawa et al. ............... 310/198 |

FOREIGN PATENT DOCUMENTS

JP 2003-259582 9/2003
JP 2004-88915 3/2004

* cited by examiner

*Primary Examiner*—Thanh Lam
(74) *Attorney, Agent, or Firm*—Colin P. Cahoon; Carstens & Cahoon, LLP

(57) ABSTRACT

A stator of a direct current motor includes six magnetic poles. An armature of the direct current motor includes an armature core having eight slots, a plurality of windings wound around the armature core as concentrated windings, and a commutator having twenty-four segments connected to the windings. The plurality of windings are connected to one another to form a single closed loop. The direct current motor further includes an anode power supply brush and a cathode power supply brush that slidably contact the segments. The aspect ratio, which is the ratio of the diameter of the armature core with respect to the length in the axial direction of the armature core is set to a range of 3.2 through 5.6. This increases the constraint torque/mass ratio of the direct current motor.

8 Claims, 5 Drawing Sheets

DIRECT-CURRENT MOTOR

BACKGROUND OF THE INVENTION

The present invention relates to a direct current motor including an armature core around which windings are wound as concentrated windings.

A typical direct current motor includes an armature core including a plurality of teeth, and a plurality of windings wound around the teeth. A slot is formed between adjacent teeth. Such a direct current motor includes a type that has windings wound the plurality of teeth as distributed windings and a type that has windings wound around the plurality of teeth as concentrated windings. Each coil is arranged so as to traverse the plurality of slots in the distributed windings, whereas each coil is wound around only one tooth so that it does not traverse the plurality of slots in the concentrated windings. The occupation ratio of a winding in a slot is higher for concentrated windings than for distributed windings.

In lieu of the typical direct current motor, which includes two magnetic poles (magnets) and three slots, a direct current motor including a greater number of magnetic poles and slots has been proposed. For instance, Japanese Laid-Open Patent Publication No. 2004-88915 describes a direct current motor including six magnetic poles, eight slots, and twenty-four commutator segments. A larger number of magnetic poles and slots enables effective use of the magnetic flux. This enables the manufacturing of a further miniaturized and lighter direct current motor.

In a direct current motor as that described above, it is effective to have a large ratio of the constraint torque with respect to the mass of the portion of the motor functioning as a magnetic path (including armature core), that is, the constraint torque/mass ratio, when manufacturing a further miniaturized and lighter motor. However, it would be insufficient just to increase the number of magnetic poles and the number of slots to increase the constraint torque/mass ratio. Further, various specifications other than the number of magnetic poles and the number of slots must be optimized.

SUMMARY OF THE INVENTION

It is an object of the present invention to provide a direct current motor that increases the constraint torque/mass ratio.

To achieve the above object, one aspect of the present invention provides a direct current motor including a state and an armature. The stator includes a plurality of magnetic poles. The armature includes an armature core having a plurality of slots, a plurality of windings wound around the armature core as concentrated windings, and a commutator having a plurality of segments connected to the windings. The plurality of windings are connected to one another to form a single closed loop. The armature core has an aspect ratio, which is the ratio of the diameter of the armature core with respect to the axial length of the armature core. The direct current motor further includes an anode power supply brush and a cathode power supply brush that slidably contact the segments. The direct current motor satisfies one of following requirements i) to v) is satisfied:

i) the aspect ratio being in a range of 3.2 through 5.6 when the number of magnetic poles is six, the number of slots is eight, and the number of segments is twenty-four;

ii) the aspect ratio being in a range of 3.4 through 5.8 when the number of magnetic poles is eight, the number of slots is nine, and the number of segments is thirty-six;

iii) the aspect ratio being in a range of 3.7 through 6.1 when the number of magnetic poles is ten, the number of slots is eight, and the number of segments is forty;

iv) the aspect ratio being in a range of 3.7 through 6.1 when the number of magnetic poles is ten, the number of slots is twelve, and the number of segments is sixty; and v) the aspect ratio being in a range of 3.2 through 5.6 when the number of magnetic poles is six, the number of slots is seven, and the number of segments is twenty-one.

BRIEF DESCRIPTION OF THE DRAWINGS

The novel features of the present invention, together with objects and advantages thereof, may best be understood by reference to the following description of the presently preferred embodiments together with the accompanying drawings in which.

DETAILED DESCRIPTION OF THE PREFERRED EMBODIMENTS

One embodiment of the present invention will now be described with reference to FIGS. 1 to 5.

Figure 1:
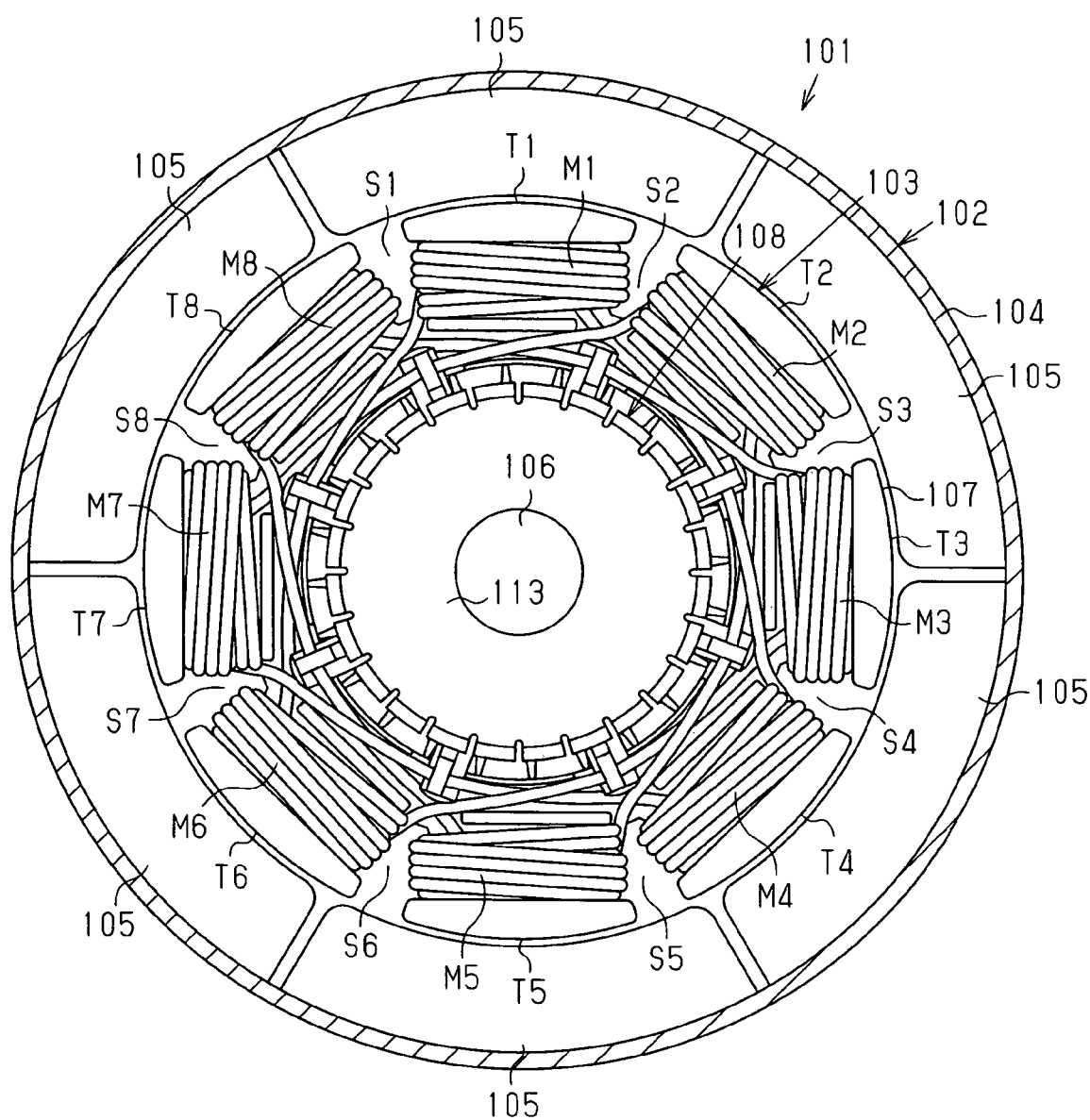
FIG. 1 is a schematic plan cross-sectional view of a motor according to one embodiment of the present invention.
Figure 2:
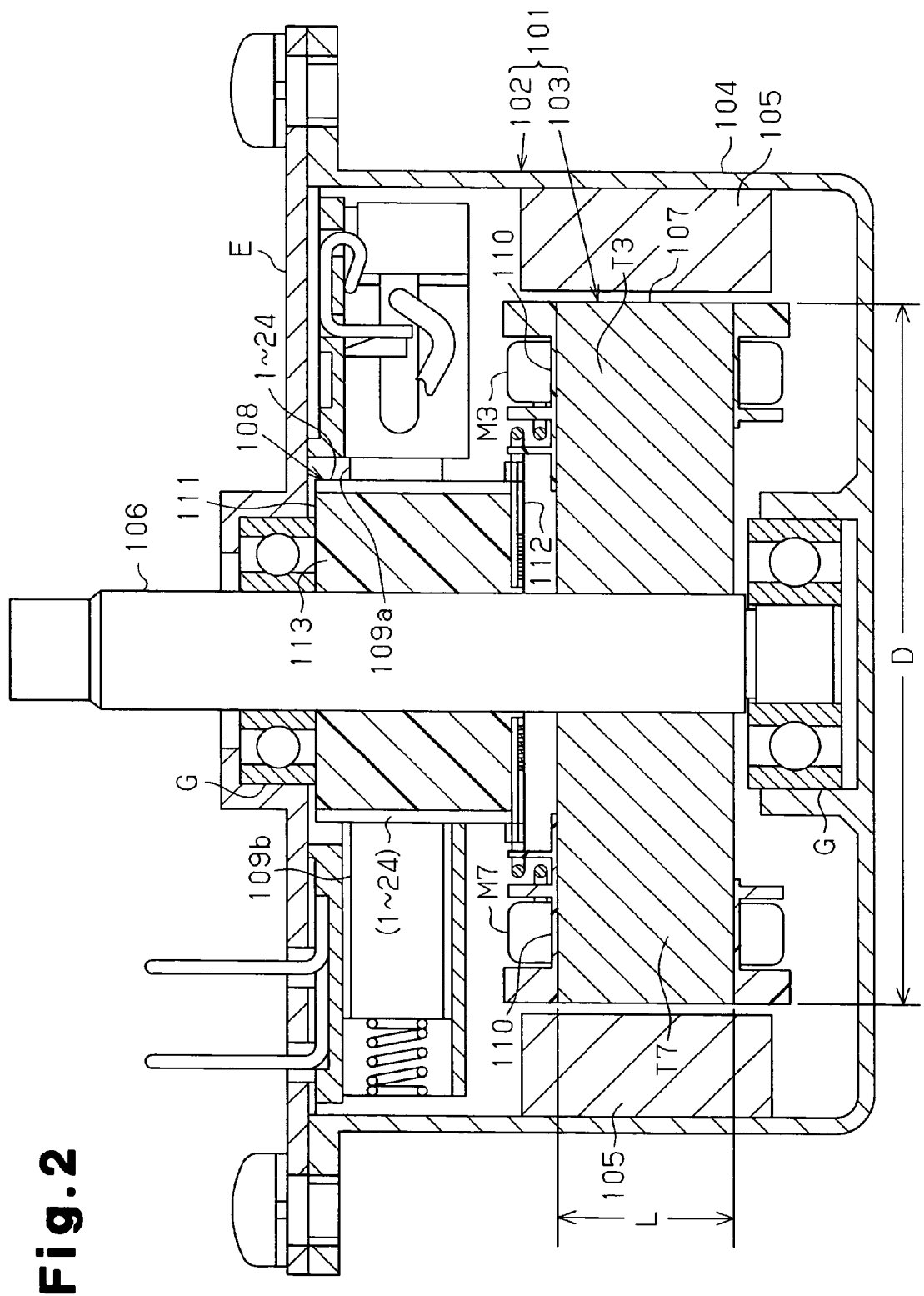
FIG. 2 is a front cross-sectional view of the motor of FIG. 1.

As shown in FIG. 1 and FIG. 2, a direct current motor 101 of the present embodiment includes a stator 102 and an armature (rotor) 103. The stator 102 includes a generally cylindrical yoke housing 104, which has a bottom wall at one end, and a plurality of (six in the present embodiment) magnets 105, which are fixed to the inner circumferential surface of the yoke housing 104 at equiangular intervals. The six magnets 105 form six magnetic poles. An end plate E is fixed to the yoke housing 104 so as to close the opening of the yoke housing 104. The yoke housing 104 and the end plate E form a motor housing.

The armature 103 includes a rotation shaft 106, an armature core 107 fixed to the rotation shaft 106, and a commutator 108 also fixed to the rotation shaft 106. The rotation shaft 106 is supported by bearings G received by the bottom wall of the yoke housing 104 and the end plate E. This rotatably supports the armature 103 with respect to the motor housing. The armature core 107 faces the magnets 105 and is surrounded by the magnets 105. An anode power supply brush 109a and a cathode power supply brush 109b are held by the end plate E so as to contact the outer circumferential surface of the commutator 108.

The armature core 107 has eight teeth T1 to T8 radially extending about the rotation shaft 106 and slots S1 to S8 respectively formed between adjacent teeth T1 to T8. That is, the number of slots is eight in the present embodiment. Windings M1 to M8 are wound as concentrated windings around each tooth T1 to T8 with insulators 110 arranged therebetween. Each of the windings M1 to M8 passes through the slots S1 to S8 on both sides of the corresponding teeth T1 to T8.

As shown in FIG. 2, the commutator 108 includes a commutator main body 111 and a short circuit member 112. The commutator main body 111 includes a generally cylindrical insulative material 113, and twenty-four segments 1 to 24 (refer to FIG. 4A) arranged at equiangular intervals along the peripheral surface of the insulative material 113. The segments 1 to 24 are arranged around the insulative material 113 so as to form a substantially cylindrical shape. The anode and cathode power supply brushes 109a and 109b slidably contact the segments 1 to 24 from the outer side in the radial direction.

Figure 4A:
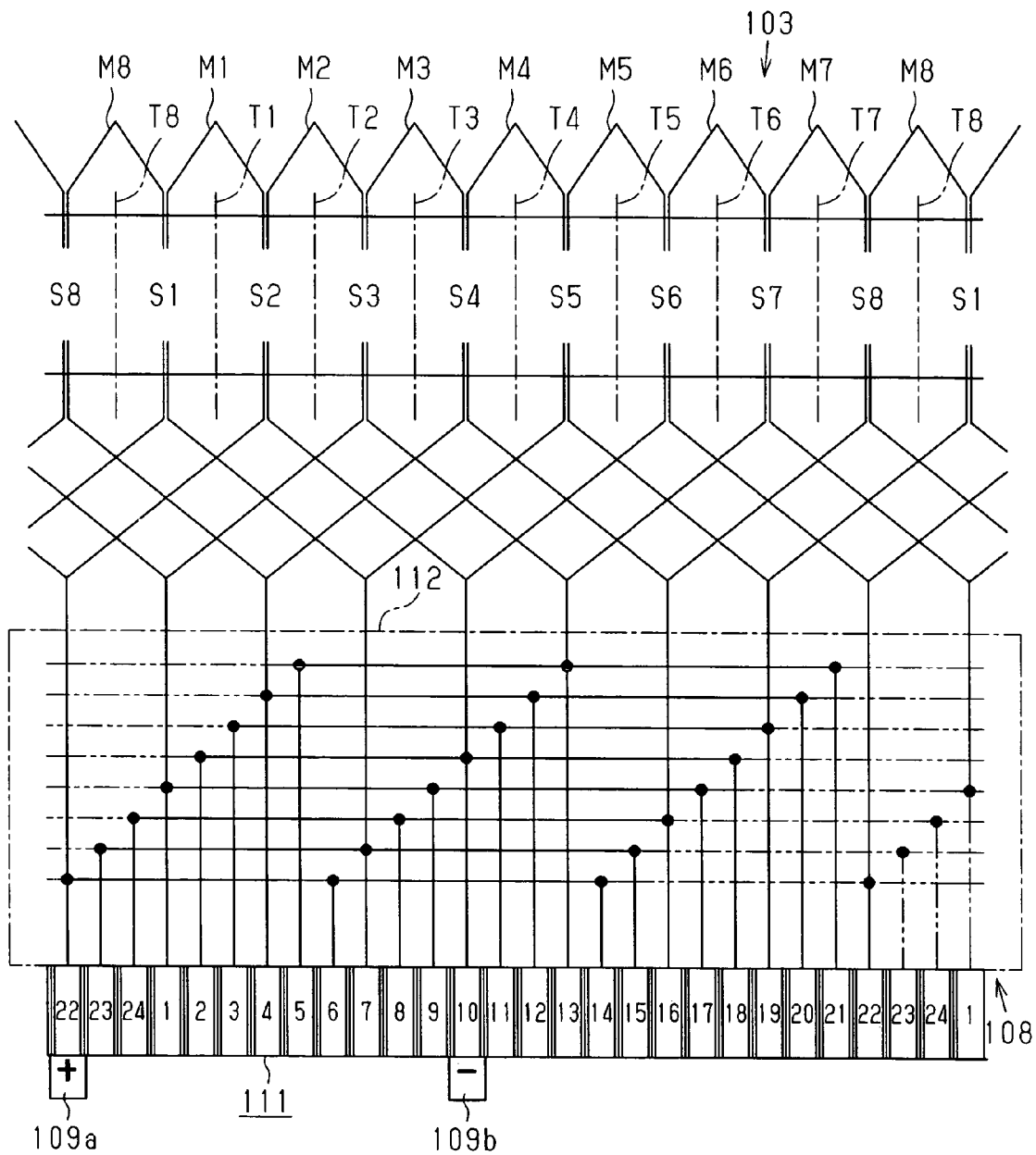
FIG. 4A is a schematic diagram showing an armature in a unfolded state.

The short circuit member 112 is fixed to one end portion of the commutator main body 111 with respect to the axial direction and electrically connects each of the segments 1 to 24 to the eighth and the sixteenth segments in the circumferential direction, as shown in FIG. 4A. That is, the short circuit member 112 connects (short circuits) three segments arranged at an interval of 120 degrees, for example, segments 1, 9, 17, or segments 5, 13, 21, so that they have the same potential. There are a total of eight sets of three segments that are short circuited in this manner.

Figure 3:
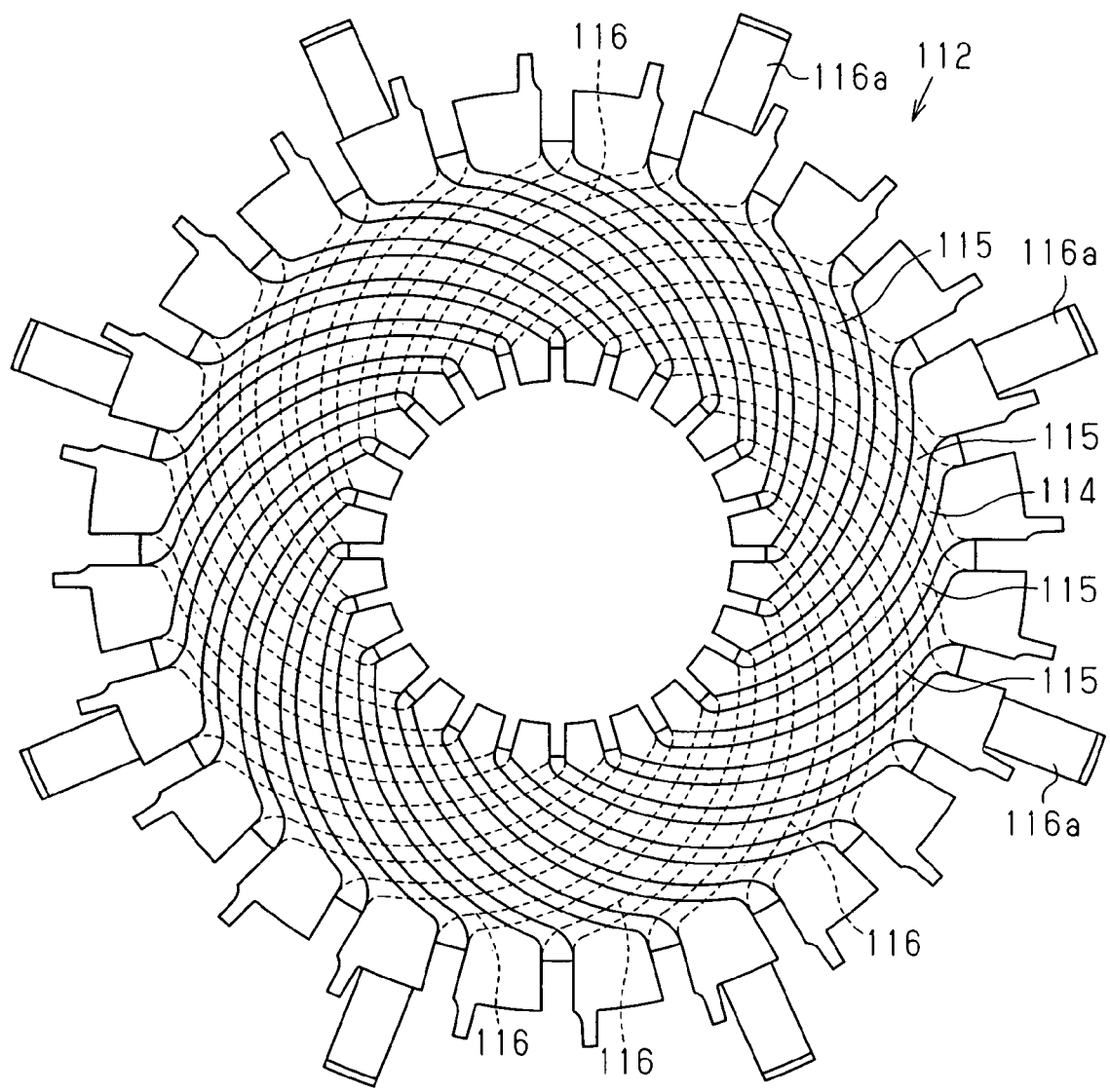
FIG. 3 is a plan view showing a short circuit member arranged in a commutator.

As shown in FIG. 3, the short circuit member 112 includes an insulation layer (insulation paper) 114 and first and second conductive layers, which sandwich the insulation layer 114. The first conductive layer includes twenty-four first short circuit pieces 115, and the second conductive layer includes twenty-four second short circuit pieces 116. Each first short circuit piece 115 includes a radially inner end portion and a radially outer end portion. The radially inner end portion is shifted by 60 degrees in one circumferential direction (clockwise direction in FIG. 3) with respect to the radially outer end portion. Each second short circuit piece 116 includes a radially inner end portion and a radially outer end portion, the radially inner end portion being shifted by 60 degrees in the other circumferential direction (counterclockwise direction in FIG. 3) with respect to the radially outer end portion. The first short circuit pieces 115 and the second short circuit pieces 116 are electrically connected to one another at the their radially inner end portions and electrically connected to one another at their radially outer end portions. As a result, three first short circuit pieces 115, which are arranged at an interval of 120 degrees, are electrically connected by three second short circuit pieces 116, which are arranged at an interval of 120 degrees. In other words, three second short circuit pieces 116 arranged at an interval of 120 degrees are electrically connected by three first short circuit pieces 115 arranged at an interval of 120 degrees.

The short circuit member 112 is fixed to the commutator main body 111 so that each pair of radially outer end portions of the two short circuit pieces 115 and 116, which are electrically connected to each other, is electrically connected to one of the segments 1 to 24. Risers 116a for joining the ends of the windings M1 to M8 are formed at the radially outer end portions of eight of the twenty-four second short circuit pieces 116 arranged at equiangular intervals, or every third second short circuit piece 116.

Figure 4B:
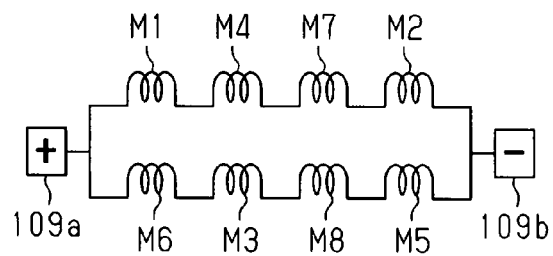
FIG. 4B is a circuit diagram showing a connecting format for windings in the armature of FIG. 4A.

The two ends of each winding M1 to M8 are each connected to one of the risers 116a so that the windings M1 to M8 are connected to the segments 1 to 24 by the short circuit member 112. In this state, eight windings M1 to M8 are connected in series to form a single closed loop, as shown in FIG. 4A and FIG. 4B. The windings M1 to M8 are connected in series in the order of M1, M4, M7, M2, M5, M8, M3, M6, M1, . . . . Further, two electrical paths, each including four windings connected in series, are formed in parallel between the anode power supply brush 109a and the cathode power supply brush 109b by connecting the windings M1 to M8 in such manner. In other words, the two brushes 109a and 109b are connected by the two parallel electrical paths, each including four windings connected in series. This is hereinafter referred to as the number a of parallel circuits between the brushes 109a, 109b being two.

As shown in FIG. 2, when the diameter of the armature core 107 is D and the length (thickness) in the axial direction of the armature core 107 is L, the aspect ratio D/L which is the ratio of the diameter D with respect to the length L in the axial direction is set to 3.8 in the armature core 107 of the present embodiment.

Figure 5:
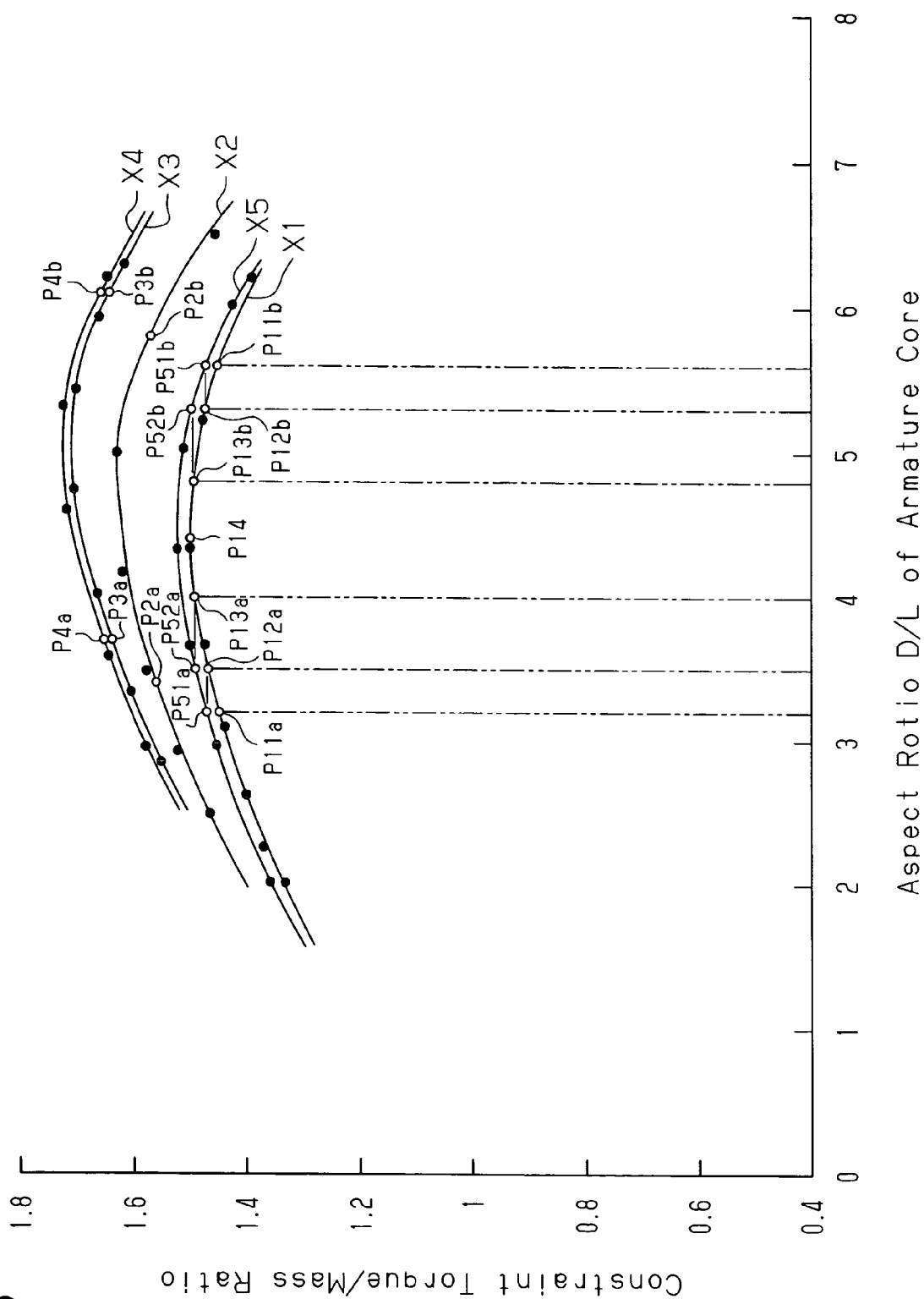
FIG. 5 is a graph showing the relationship between an aspect ratio D/L of the armature core and the constraint torque/mass ratio.

FIG. 5 is a graph showing the result of an experiment that was conducted with regard to the relationship between the aspect ratio D/L of the armature core 107 and the constraint torque/mass ratio in the direct current motor 101. The mass in the constraint torque/mass ratio is the mass of the portion of the direct current motor 101 functioning as the magnetic path, which is the mass of the portion including the yoke housing 104, the magnet 105, and the windings M1 to M8 in addition to the armature core 107. The value of the constraint torque/mass ratio is a ratio having a predetermined value (1.0) as the reference. In the experiment, irrespective of the aspect ratio D/L, a ferrite magnet (4.7 MGOe) was used for the magnet 105, the occupation ratio of the windings M1 to M8 in the slots S1 to S8 was set to 50%, the power supply voltage was set to 12 V, the joule loss/core surface area was set to 0.2 W/square centimeter, and the loading ratio was set to 50 or greater. The loading ratio was a value obtained by multiplying the (number m of magnetic poles×magnetic flux φ)/{(number of winds Z of the windings×current I)/(2×number a of parallel circuits)} by 100.

As shown in FIG. 5, the direct current motor 101 of the present embodiment, which includes six magnetic poles and eight slots, has the characteristic shown by curve X1. As apparent from characteristic line X1, the constraint torque/mass ratio increases in a range (first range) in which the aspect ratio D/L is between 3.2 (points P11a) and 5.6 (points P11b). The constraint torque/mass ratio increases in a range (second range) in which the aspect ratio D/L is between 3.5 (points P12a) and 5.3 (points P12b). Further, the constraint torque/mass ratio becomes substantially maximal in a range (third range) in which the aspect ratio D/L is between 4.0 (point P13a) and 4.8 (point P13b). In particular, the constraint torque/mass ratio becomes maximal when the aspect ratio D/L is 4.4 (points P14).

The lower limit 3.2 (points P11a) in the first range of the aspect ratio D/L is set to a value smaller by 1.2 with respect to the maximum value 4.4 (point P14) of the aspect ratio D/L, and the upper limit 5.6 (point P11b) in the first range of the aspect ratio D/L is set to a value greater by 1.2 with respect to the maximum value 4.4 (point P14).

Characteristic line X5 shown in FIG. 5 is obtained by conducting an experiment in the same manner as that for the direct current motor 101 of the present embodiment on the direct current motor including six magnetic poles, seven slots, and twenty-one segments.

Point P51a on characteristic line X5 corresponds to the aspect ratio D/L of 3.2, and the horizontal line that extends through point P51a intersects point P12a on characteristic line X1. The aspect ratio D/L corresponding to point P12a on characteristic line X1 is set as the lower limit (3.5 in the present embodiment) in the second range.

Point P51b on characteristic line X5 corresponds to the aspect ratio D/L of 5.6, and the horizontal line that extends through point P51b intersects point P12b on characteristic line X1. The aspect ratio D/L corresponding to point P12b on characteristic line X1 is set as the upper limit (5.3 in the present embodiment) in the second range.

Point P52a on characteristic line X5 corresponds to the aspect ratio D/L of 3.5, and the horizontal line that extends through point P52a intersects point P13a on characteristic line X1. The aspect ratio D/L corresponding to point P13a on the characteristic line X1 is set as the lower limit (4.0 in the present embodiment) in the third range.

Point P52b on characteristic line X5 corresponds to the aspect ratio D/L of 5.3, and the horizontal line that extends through point P52b intersects point P13b on characteristic line X1. The aspect ratio D/L corresponding to point P13b on characteristic line X1 is set as the upper limit (4.8 in the present embodiment) in the third range.

Effective use of the magnetic flux is enabled effectively used and the motor 101 may be miniaturized and made lighter with the direct current motor 101 of the present embodiment in which the number m of magnetic poles is six and the number of slots is eight compared to a direct current motor in which the number of magnetic poles and the number of slots are less. When the windings M1 to M8 are arranged so as to form a single closed loop, the number a of parallel circuits between the anode power supply brush 109a and the cathode power supply brush 109b is two. The voltage applied to each winding M1 to M8 is reduced and rectification is satisfactorily performed in such a direct current motor 101. Further, the constraint torque/mass ratio may be increased since the armature core 107 is formed so that the aspect ratio D/L is within a range of 3.2 to 5.6. Further, in the present embodiment, since the aspect ratio D/L is set to 3.8, which is in the range of 3.5 to 5.3, the constraint torque/mass ratio is increased. This enables the direct current motor 101 to be further miniaturized and made lighter.

The embodiment may be modified as described below.

The aspect ratio D/L is set to 3.8 in the present embodiment but may be changed to any aspect ratio as long as it is within the range of 3.2 to 5.6. For instance, the aspect ratio D/L may be set to a value (e.g., 3.3 or 5.5) within the range of 3.2 to 5.6 excluding the range of 3.5 to 5.3. Alternatively, the aspect ratio D/L may be set to a value (e.g., 3.6 or 5.2) within the range of 3.5 to 5.3 excluding the range of 3.8 and 4.0 to 4.8. The constraint torque/mass ratio can be sufficiently increased in these cases, too. For instance, the aspect ratio D/L may be set to a value (e.g., 4.2 or 4.6) within the range of 4.0 to 4.8. This enables the constraint torque/mass ratio to be substantially maximized.

The commutator 108 of the above embodiment may be changed to have other configurations as long as a similar function is provided. For instance, the short circuit member 112 may be changed to other configurations as long as it electrically connects three segments arranged at an interval of 120 degrees.

The direct current motor 101 of the above embodiment is not limited to the configuration of the experiment (the magnet 105 being a ferrite magnet (4.7 MGOe), and occupation ratio of windings M1 to M8 being 50%, etc.), and may be changed to other configurations.

The number of the magnetic poles is six, the number of the slots S1 to S8 is eight, and the number of the segments 1 to 24 is twenty-four in the above embodiment. However, these numbers may be changed. In such a case, a configuration in which all the wirings are arranged in concentrated windings to form a single closed loop is adapted.

For example, in the direct current motor of the present invention, the number of magnetic poles may be eight, the number of slots may be nine, and the number of segments may be thirty-six. Curve X2 indicating the characteristic of such a direct current motor is shown in FIG. 5. Characteristic line X2 was obtained by conducting an experiment in the same manner as that for the motor 101 of FIG. 1 and FIG. 2. As apparent from characteristic line X2, the constraint torque/mass ratio increases in the range in which the aspect ratio D/L is between 3.4 (point P2a) and 5.8 (point P2b) in the direct current motor.

In the motor 101 of FIGS. 1 and 2, the width of the range 3.2 to 5.6 of the aspect ratio D/L in which the constraint torque/mass ratio increases is 2.4 (=5.6−3.2). In the above direct current motor (number of magnetic poles: 8, number of slots: 9, number of segments: 36), the range (i.e., 3.4 to 5.8) of the aspect ratio D/L in which the constraint torque/mass ratio increases is set so as to have the width of 2.4, which is the same as the width of the range of the optimal aspect ratio D/L in the motor 101 of FIGS. 1 and 2.

Further, in the above direct current motor (number of magnetic poles: 8, number of slots: 9, number of segments: 36), the constraint torque/mass ratio becomes substantially maximal in the range in which the aspect ratio D/L is between 4.1 and 5.4. Thus, in this direct current motor, the constraint torque/mass ratio may be increased by setting the aspect ratio D/L to a value within the range of between 3.4 and 5.8, and the constraint torque/mass ratio may be substantially maximized by setting the aspect ratio D/L to a value within the range of between 4.1 and 5.4.

In the direct current motor of the present invention, the number of magnetic poles may be ten, the number of slots may be eight, and the number of segments may be forty. Curve X3 indicating the characteristic of the direct current motor is shown in FIG. 5. Characteristic line X3 was obtained by performing an experiment similar to the motor 101 of FIG. 1 and FIG. 2. As apparent from the characteristic line X3, the constraint torque/mass ratio increases in the range in which the aspect ratio D/L is between 3.7 (point P3a) and 6.1 (point P3b) in this direct current motor. In this direct current motor, the range (i.e., 3.7 to 6.1) of the aspect ratio D/L in which the constraint torque/mass ratio increases is also set so as to have a width of 2.4, which is the same width as the range of the optimal aspect ratio D/L in the motor 101 of FIGS. 1 and 2. The constraint torque/mass ratio becomes substantially maximal in the range in which the aspect ratio D/L is between 4.4 and 5.7. Thus, in this direct current motor, the constraint torque/mass ratio is increased by setting the aspect ratio D/L to a value within the range of between 3.7 and 6.1, and the constraint torque/mass ratio is substantially maximized by setting the aspect ratio D/L to a value within the range of between 4.4 and 5.7.

In the direct current motor of the present invention, the number of magnetic poles may be ten, the number of slots may be twelve, and the number of segments may be sixty. Curve X4 indicating the characteristic of the direct current motor is shown in FIG. 5. Characteristic line X4 is obtained by conducting an experiment in the same manner as that for the motor 101 of FIGS. 1 and 2. As apparent from characteristic line X4, the constraint torque/mass ratio increases in the range in which the aspect ratio D/L is between 3.7 (point P4a) and 6.1 (point P4b) in this direct current motor. In this direct current motor, the range (i.e., 3.7 to 6.1) of the aspect ratio D/L in which the constraint torque/mass ratio increases is also set so as to have a width of 2.4, which is the same as the width of the range of the optimal aspect ratio D/L in the motor 101 of FIGS. 1 and 2. The constraint torque/mass ratio becomes substantially maximal in the range in which the aspect ratio D/L is between 4.4 and 5.7. Thus, in this direct current motor, the constraint torque/mass ratio may be increased by setting the aspect ratio D/L to a value within the range of between 3.7 and 6.1, and the constraint torque/mass ratio may be substantially maximized by setting the aspect ratio D/L to a value within a range of between 4.4 and 5.7.

In the direct current motor of the present invention, the number of magnetic poles may be six, the number of slots may be seven, and the number of segments may be twenty-one. Curve X5 indicating the characteristic of the direct current motor is shown in FIG. 5, as described above. As apparent from characteristic line X5, the constraint torque/mass ratio increases in the range in which the aspect ratio D/L is between 3.2 (point P51a) and 5.6 (point P51b) in this direct current motor. In this direct current motor, the range (i.e., 3.2 to 5.6) of the aspect ratio D/L in which the constraint torque/mass ratio increases is set so as to have a width of 2.4, which is the same as the width of the range of the optimal aspect ratio D/L in the motor 101 of FIGS. 1 and 2. The constraint torque/mass ratio increases in the range in which the aspect ratio D/L is between 3.5 and 5.3. The constraint torque/mass ratio is substantially maximized in the range in which the aspect ratio D/L is between 4.0 and 4.8. Thus, in this direct current motor, the constraint torque/mass ratio may be increased by setting the aspect ratio D/L to a value within the range of between 3.2 and 5.6, the constraint torque/mass ratio may be increased by setting the aspect ratio D/L to a value within the range of between 3.5 and 5.3, and the constraint torque/mass ratio may be substantially maximized by setting the aspect ratio D/L to a value within a range of between 4.0 and 4.8.

Although only a number of embodiments have been described here, it should be apparent to those skilled in the art that the present invention may be embodied in many other specific forms without departing from the spirit or scope of the invention. The present invention is not limited to the contents of this description and may be modified within the scope and equivalence of the appended claims.

The invention claimed is:

1. A direct current motor comprising:
   a stator including a plurality of magnetic poles;
   an armature including an armature core having a plurality of slots, a plurality of windings wound around the armature core as concentrated windings, and a commutator having a plurality of segments connected to the windings, wherein the plurality of windings are connected to one another to form a single closed loop, and the armature core has an aspect ratio, which is the ratio of the diameter of the armature core with respect to the axial length of the armature core; and
   an anode power supply brush and a cathode power supply brush that slidably contact the segments,
   wherein one of following requirements i) to v) is satisfied:
      i) the aspect ratio being in a range of 3.2 through 5.6 when the number of magnetic poles is six, the number of slots is eight, and the number of segments is twenty-four;
      ii) the aspect ratio being in a range of 3.4 through 5.8 when the number of magnetic poles is eight, the number of slots is nine, and the number of segments is thirty-six;
      iii) the aspect ratio being in a range of 3.7 through 6.1 when the number of magnetic poles is ten, the number of slots is eight, and the number of segments is forty;
      iv) the aspect ratio being in a range of 3.7 through 6.1 when the number of magnetic poles is ten, the number of slots is twelve, and the number of segments is sixty; and
      v) the aspect ratio being in a range of 3.2 through 5.6 when the number of magnetic poles is six, the number of slots is seven, and the number of segments is twenty-one.

2. The direct current motor according to claim 1, wherein requirement i) is satisfied.

3. The direct current motor according to claim 2, wherein the aspect ratio is in a range of 3.5 through 5.3.

4. The direct current motor according to claim 2, wherein the aspect ratio is in a range of 4.0 through 4.8.

5. The direct current motor according to claim 1, wherein requirement ii) is satisfied.

6. The direct current motor according to claim 1, wherein requirement iii) is satisfied.

7. The direct current motor according to claim 1, wherein requirement iv) is satisfied.

8. The direct current motor according to claim 1, wherein requirement v) is satisfied.

* * * * *